United States Patent
LeCrone et al.

(10) Patent No.: US 11,570,282 B2
(45) Date of Patent: Jan. 31, 2023

(54) USING HIGH SPEED DATA TRANSFER PROTOCOL

(71) Applicant: EMC IP Holding Company LLC, Hopkinton, MA (US)

(72) Inventors: Douglas E. LeCrone, Hopkinton, MA (US); Paul A. Linstead, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 284 days.

(21) Appl. No.: 16/686,825

(22) Filed: Nov. 18, 2019

(65) Prior Publication Data

US 2021/0152670 A1    May 20, 2021

(51) Int. Cl.
| | | |
|---|---|---|
| *H04L 69/163* | (2022.01) | |
| *H04L 69/166* | (2022.01) | |
| *H04L 67/1097* | (2022.01) | |
| *H04L 69/16* | (2022.01) | |

(52) U.S. Cl.
CPC ........ *H04L 69/163* (2013.01); *H04L 67/1097* (2013.01); *H04L 69/161* (2013.01); *H04L 69/166* (2013.01)

(58) Field of Classification Search
CPC .......................... H04L 67/1097; H04L 69/161
See application file for complete search history.

(56) References Cited

U.S. PATENT DOCUMENTS

| | | | | |
|---|---|---|---|---|
| 2005/0013322 A1* | 1/2005 | Yamagishi | ........ | H04L 12/40065 370/468 |
| 2013/0080722 A1* | 3/2013 | Sano | ................... | G06F 11/1443 711/E12.103 |
| 2014/0032779 A1* | 1/2014 | Boucher | ............... | H04L 67/327 709/232 |
| 2017/0139764 A1* | 5/2017 | Batchelor | ................ | G06F 3/06 |
| 2019/0243549 A1* | 8/2019 | Sullivan | ............. | H04L 67/1097 |
| 2019/0324668 A1* | 10/2019 | Michaud | ............... | G06F 3/0688 |
| 2020/0050384 A1* | 2/2020 | Gupta | ................... | G06F 3/0635 |
| 2020/0356278 A1* | 11/2020 | Gupta | ..................... | G06F 3/061 |

* cited by examiner

*Primary Examiner* — Nicholas R Taylor
*Assistant Examiner* — Sm Z Islam
(74) *Attorney, Agent, or Firm* — Muirhead and Saturnelli, LLC

(57) ABSTRACT

Using high speed data transfer protocol to transfer data between a host and a storage system includes determining if a portion of data is a candidate for being transferred using the high speed data transfer protocol if the portion is not a candidate for high speed data transfer, transferring the data using a relatively low speed data transfer protocol if the portion is a candidate for high speed data transfer, attempting to transfer the data using the high speed data transfer protocol, and if transferring the data using the high speed data transfer protocol is unsuccessful, transferring the data using the relatively low speed data transfer protocol. The high speed data transfer protocol may use a first connection and the relatively low speed data transfer protocol may use a second connection. The first connection may be a PCIe or InfiniBand connection. The second connection may be a FICON connection.

20 Claims, 4 Drawing Sheets

USING HIGH SPEED DATA TRANSFER PROTOCOL

TECHNICAL FIELD

This application relates to the field of computer systems and storage system therefor and, more particularly, to the field of storage access and I/O operations among computing systems and storage system.

BACKGROUND OF THE INVENTION

Host processor systems may store and retrieve data using a storage system containing a plurality of host interface units (I/O modules), disk drives, and disk interface units (disk adapters). The host systems access the storage systems through a plurality of channels provided therewith. Host systems provide data and access control information through the channels to the storage system and the storage system provides data to the host systems also through the channels. The host systems do not address the disk drives of the storage system directly, but rather, access what appears to the host systems as a plurality of logical disk units. The logical disk units may or may not correspond to any one of the actual disk drives. Allowing multiple host systems to access the single storage system allows the host systems to share data stored therein.

Communication between a host processor system and a storage system may be performed using conventional protocols and connections, such as FICON and the zHPF protocol, to exchange data and status information between the host processor system and the storage system. In instances where high speed data transfers are desired, faster protocols exist, such as the zHyperlink protocol. However, high speed data transfer protocols often require special conditions that are maintained by dedicated applications running on the host systems. The dedicated applications are written specifically to use and maintain high speed protocol connections. Thus, generic applications end up using slower data transfer protocols because the generic applications are not specifically written to use high speed data transfer protocols even though the generic applications could otherwise benefit from high speed data transfer.

Accordingly, it is desirable to provide a mechanism that allows generic applications to automatically take be able to us high speed data transfer protocols.

SUMMARY OF THE INVENTION

According to the system described herein, using high speed data transfer protocol to transfer data between a host and a storage system includes determining if a portion of data is a candidate for being transferred using the high speed data transfer protocol, if the portion is not a candidate for high speed data transfer, transferring the data using a relatively low speed data transfer protocol, if the portion is a candidate for high speed data transfer, attempting to transfer the data using the high speed data transfer protocol, and if transferring the data using the high speed data transfer protocol is unsuccessful, transferring the data using the relatively low speed data transfer protocol. The high speed data transfer protocol may be zHyperlink. The relatively low speed data transfer protocol may be zHPF. The high speed data transfer protocol may use a first connection between the host and the storage system and the relatively low speed data transfer protocol may use a second connection between the host and the storage system. The first connection may be a PCIe connection or an InfiniBand connection. The second connection may be a FICON connection. Determining if the portion of data is a candidate for being transferred using the high speed data transfer protocol may determine if the data has recently been accessed. Determining if the portion of data is a candidate for being transferred using the high speed data transfer protocol may determine if the data has been prefetched into cache memory. Relatively large portions of data may be split up into smaller portions that are examined for possible transfer using the high speed data transfer protocol. A drivers layer on the host may determine if a portion of the data is a candidate for being transferred using the high speed data transfer protocol.

According further to the system described herein, a non-transitory computer readable medium contains software that uses high speed data transfer protocol to transfer data between a host and a storage system. The software includes executable code that determines if a portion of data is a candidate for being transferred using the high speed data transfer protocol, executable code that transfers the data using a relatively low speed data transfer protocol if the portion is not a candidate for high speed data transfer, executable code that attempts to transfer the data using the high speed data transfer protocol if the portion is a candidate for high speed data transfer, and executable code that transfers the data using the relatively low speed data transfer protocol if transferring the data using the high speed data transfer protocol is unsuccessful. The high speed data transfer protocol may be zHyperlink. The relatively low speed data transfer protocol may be zHPF. The high speed data transfer protocol may use a first connection between the host and the storage system and the relatively low speed data transfer protocol may use a second connection between the host and the storage system. The first connection may be a PCIe connection or an InfiniBand connection. The second connection may be a FICON connection. Determining if the portion of data is a candidate for being transferred using the high speed data transfer protocol may determine if the data has recently been accessed. Determining if the portion of data is a candidate for being transferred using the high speed data transfer protocol may determine if the data has been prefetched into cache memory. Relatively large portions of data may be split up into smaller portions that are examined for possible transfer using the high speed data transfer protocol. A drivers layer on the host may determine if a portion of the data is a candidate for being transferred using the high speed data transfer protocol.

BRIEF DESCRIPTION OF THE DRAWINGS

Embodiments of the system are described with reference to the several figures of the drawings, noted as follows.

DETAILED DESCRIPTION OF VARIOUS EMBODIMENTS

The system described herein examines data being exchanged between a host system and a storage system and determines which data is a candidate for being transferred using a high speed protocol, such as zHyperlink. The system then attempts to transfer the candidate data using the high speed protocol. If the high speed transfer is unsuccessful, the system transfers the data using a conventional transfer mechanism, such as zHPF over FICON.

Figure 1:
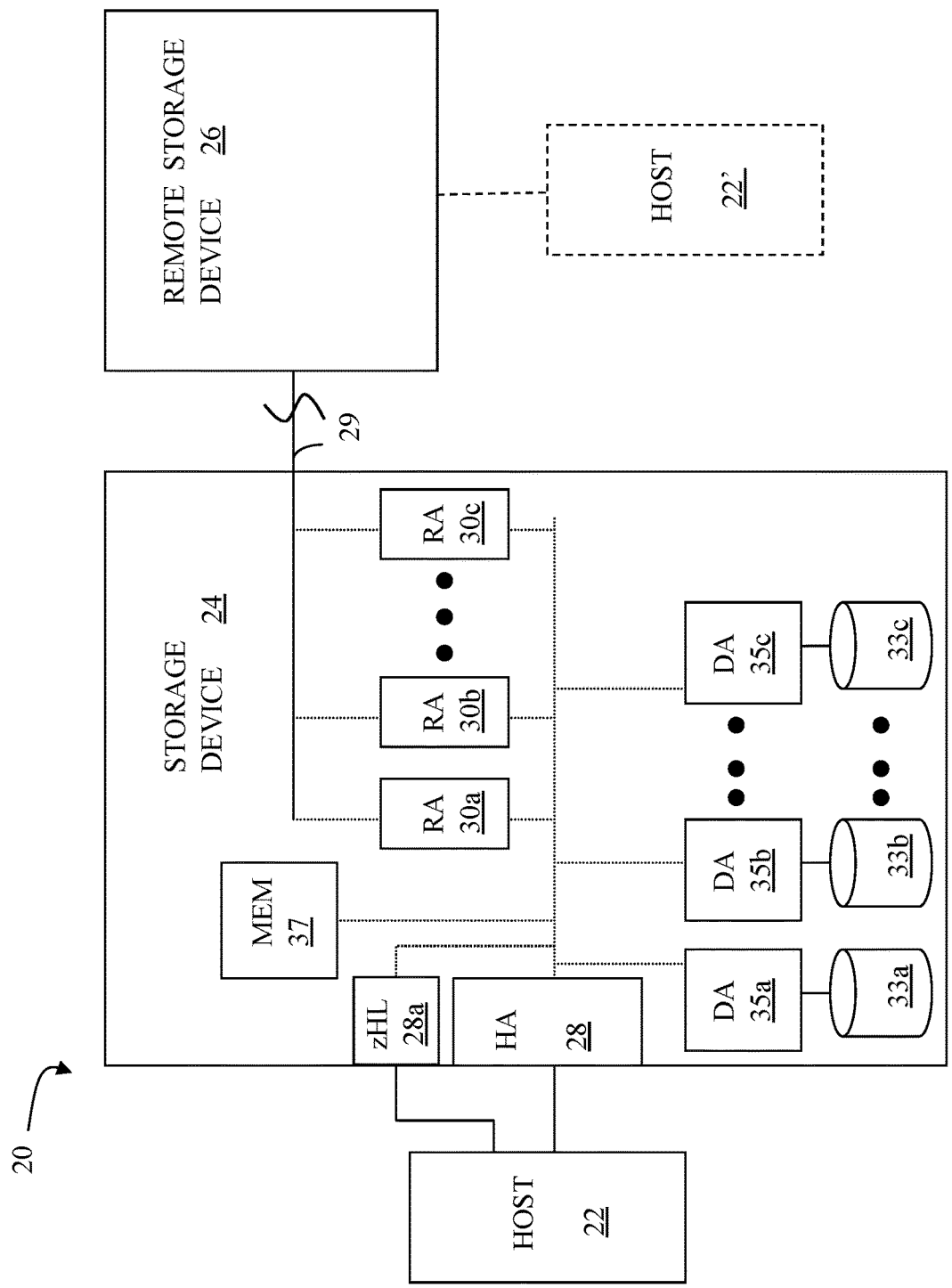
FIG. 1 is a schematic illustration showing a relationship between a host and a storage system that may be used in connection with an embodiment of the system described herein.

FIG. 1 is a diagram 20 showing a relationship between a host 22 and a storage system 24 that may be used in connection with an embodiment of the system described herein. In an embodiment, the storage system 24 may be a PowerMax, Symmetrix, or VMAX storage system produced by Dell EMC of Hopkinton, Mass.; however, the system described herein may operate with other appropriate types of storage systems. Also illustrated is another (remote) storage system 26 that may be similar to, or different from, the storage system 24 and may, in various embodiments, be coupled to the storage system 24, using, for example, a network. The host 22 reads and writes data from and to the storage system 24 via an HA 28 (host adapter) and via a zHyperlink connection to a PCIe zHyperlink board 28a disposed within the storage system 24, both of which facilitate an interface between the host 22 and the storage system 24. Although the diagram 20 shows the host 22, the PCIe zHyperlink board 28a, and the HA 28, it will be appreciated by one of ordinary skill in the art that multiple host adaptors and/or zHyperlink connections (possibly of different configurations) may be used and that one or more HAs may have one or more hosts coupled thereto. For example, in some embodiments, the PCIe connection between the host 22 and the storage system 24 may be replaced with an infiniBand connection.

In an embodiment of the system described herein, in various operations and scenarios, data from the storage system 24 may be copied to the remote storage system 26 via a link 29. For example, transferring data may be part of a data mirroring or replication process that causes data on the remote storage system 26 to be identical to the data on the storage system 24. Although only the one link 29 is shown, it is possible to have additional links between the storage systems 24, 26 and to have links between one or both of the storage systems 24, 26 and other storage systems (not shown). The storage system 24 may include a first plurality of remote adapter units (RA's) 30a, 30b, 30c. The RA's 30a-30c may be coupled to the link 29 and be similar to the HA 28, but are used to transfer data between the storage systems 24, 26.

The storage system 24 may include one or more physical storage units 33a-33c. The physical storage units may be disks, solid state storage devices, etc., each containing a different portion of data stored on the storage system 24. The storage system 24 (and/or the remote storage system 26) may be provided as a stand-alone device coupled to the host 22 as shown in FIG. 1 or, alternatively, the storage system 24 (and/or remote storage system 26) may be part of a storage area network (SAN) that includes a plurality of other storage systems as well as routers, network connections, etc. (not shown in FIG. 1). The storage systems may be coupled to a SAN fabric and/or be part of a SAN fabric. The system described herein may be implemented using software, hardware, and/or a combination of software and hardware where software may be stored in a computer readable medium and executed by one or more processors.

Each of the physical storage units 33a-33c may be coupled to a corresponding disk adapter unit (DA) 35a-35c that provides data to a corresponding one of the physical storage units 33a-33c and receives data from a corresponding one of the physical storage units 33a-33c. An internal data path exists between the DA's 35a-35c, the HA 28, the zHyperlink board 28a, and the RA's 30a-30c of the storage system 24. Note that, in other embodiments, it is possible for more than one physical storage unit to be serviced by a single DA and that it is possible for more than one DA to service a single physical storage unit. The storage system 24 may also include a global memory 37 that may be used to facilitate data transferred between the DA's 35a-35c, the HA 28, the zHyperlink board 28a, and the RA's 30a-30c as well as facilitate other operations. The memory 37 may contain task indicators that indicate tasks to be performed by one or more of the DA's 35a-35c, the HA 28, the zHyperlink board 28a, and/or the RA's 30a-30c, and may contain a cache for data fetched from one or more of the physical storage units 33a-33c.

The storage space in the storage system 24 that corresponds to the physical storage units 33a-33c may be subdivided into a plurality of volumes or logical devices. The logical devices may or may not correspond to the storage space of the physical storage units 33a-33c. Thus, for example, the physical storage unit 33a may contain a plurality of logical devices or, alternatively, a single logical device could span both of the physical storage units 33a, 33b. Similarly, the storage space for the remote storage system 26 may be subdivided into a plurality of volumes or logical devices, where each of the logical devices may or may not correspond to one or more physical storage units of the remote storage system 26.

In some embodiments, an other host 22' may be provided. The other host 22' is coupled to the remote storage system 26 and may be used for disaster recovery so that, upon failure at a site containing the host 22 and the storage system 24, operation may resume at a remote site containing the remote storage system 26 and the other host 22'. In some cases, the host 22 may be directly coupled to the remote storage system 26, thus protecting from failure of the storage system 24 without necessarily protecting from failure of the host 22.

Figure 2:
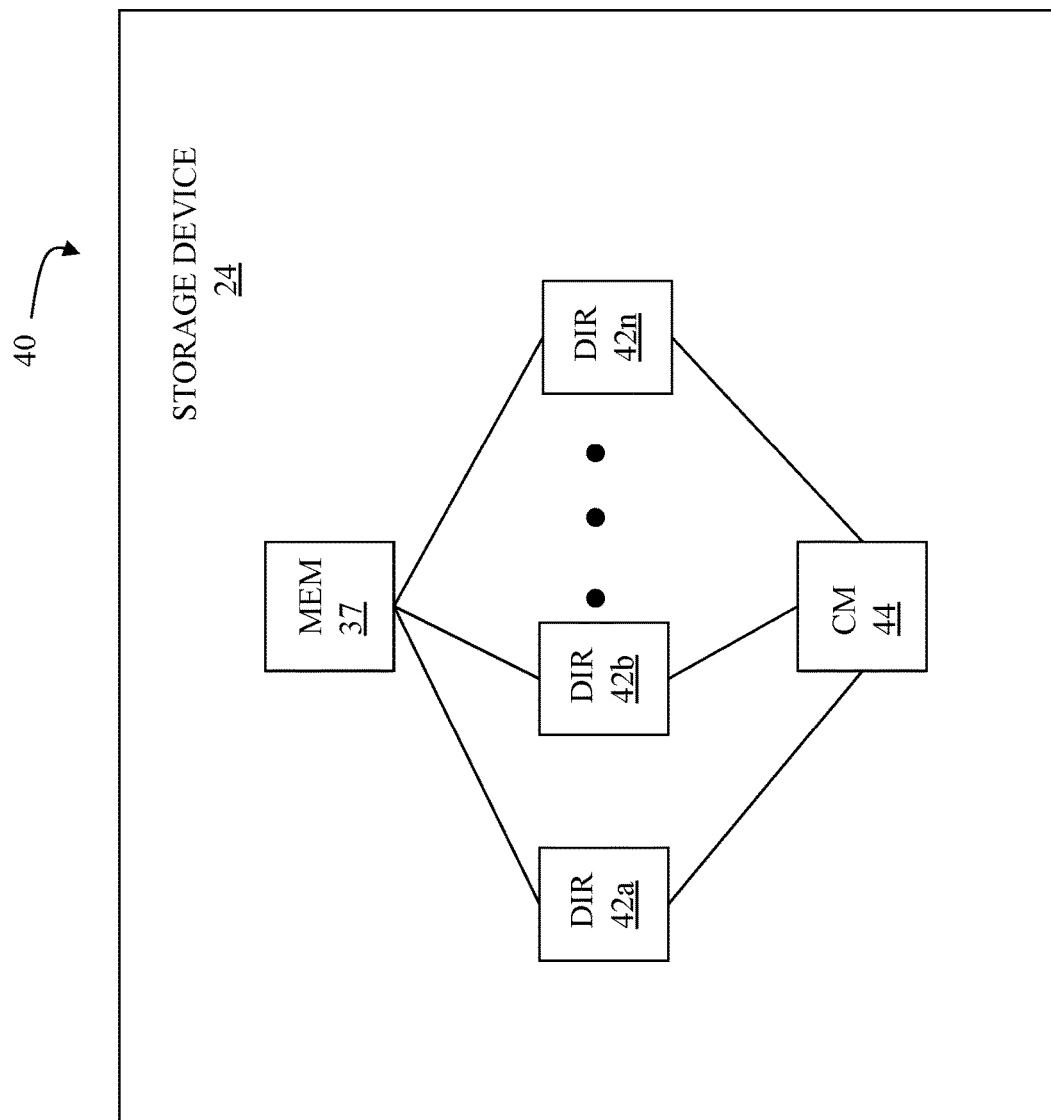
FIG. 2 is a schematic diagram illustrating an embodiment of a storage system where each of a plurality of directors are coupled to the memory according to an embodiment of the system described herein.

FIG. 2 is a schematic diagram 40 illustrating an embodiment of the storage system 24 where each of a plurality of directors 42a-42n are coupled to the memory 37. Each of the directors 42a-42n represents at least one of the HA 28, the zHyperlink board 28a, the RAs 30a-30c, or the DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one or more of the directors 42a-42n may be able to broadcast a message to all or at least some plurality of the other directors 42a-42n at the same time.

In some embodiments, one or more of the directors 42a-42n may have multiple processor systems thereon and thus may be able to perform functions for multiple discrete directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage system 24 may be provided as one or more director boards having CPUs, memory (e.g., DRAM, etc.) and interfaces with Input/Output (I/O) modules.

Note that, although specific storage system configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

A storage area network (SAN) may be used to couple one or more host systems with one or more storage systems in a manner that allows reconfiguring connections without having to physically disconnect and reconnect cables from and to ports of the devices. A storage area network may be implemented using one or more switches to which the storage systems and the host systems are coupled. The switches may be programmed to allow connections between specific ports of devices coupled to the switches. A port that can initiate a data-path connection may be called an "initiator" port while the other port may be deemed a "target" port.

Figure 3:
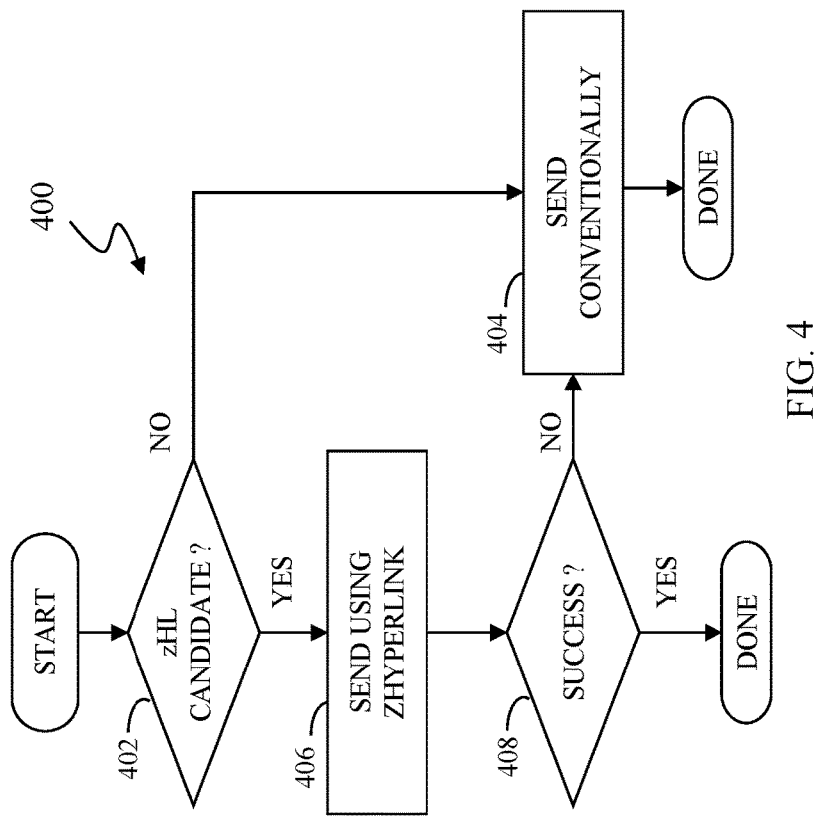
FIG. 3 is a schematic illustration showing software layers in a host according to an embodiment of the system described herein.

Referring to FIG. 3, the host 22 is shown in more detail to include software 200 having an application(s) layer 202, an access methods layer 204, a drivers layer 206, an SSCH layer 208, and a channel subsystem layer 212. The application(s) layer 202 includes one or more software applications that run on the host 22. The access methods layer 204 includes I/O routines (e.g., read, write, open, etc.) that are used by applications in the application(s) layer 202 in connection with performing I/O operations. Software in the application(s) layer 202 calls specific routines in the access methods layer 204 to access data on a storage system coupled to the host.

The I/O routines in the access methods layer 204 call driver routines in the drivers layer 206 that perform lower-level device specific operations that depend upon the specific type of I/O device and the type of connection thereto. For example, a first driver for a Symmetrix storage system coupled to the host 22 by a FICON connection may be different than a second driver used for a different type of non-volatile storage system coupled to the host 22 using a different type of connection (e.g., a zHyperlink connection). Note, however, that an application in the application layer 202 may call the same routine (e.g., read) in the access layer 204 irrespective of the physical hardware (and connection there) used for the data, but that the routine in the access layer 204 that is called may call different routines in the SSCH layer 208, depending upon a specific configuration/hardware of the system.

The SSCH layer 208 includes routines that perform low-level operations that make calls to the channel subsystem layer 212 for I/O operations that use the channel subsystem 212. The SSCH layer 208 directly controls the hardware used for channel I/O operations, including any storage systems and channels used from transferring data between the host 22 and the storage systems. Routines in the drivers layer 206 call routines in the SSCH layer 208 to perform hardware operations and to transfer data to and from the host 22 and to exchange status and control information to facilitate control of the I/O hardware. In some cases software in the drivers layer 206 may make calls that cause the zHyperlink connection (described above) to directly transfer data between the host 22 and the storage system 24. In some embodiments, a conventional FICON connection may be used to transfer some control and status information to facilitate zHyperlink data transfers.

It is possible to modify the drivers layer 206 to take advantage of the efficiencies of zHyperlink by causing high level driver operations (e.g., put, get, etc.) to transmit some of the data using the relatively fast zHyperlink connection protocol rather than a relatively slower FICON (or similar) connection protocol, such as zHPF. Applications in the applications layer 202 do not need to be modified and may continue to make the same calls to the access methods layer 204 (e.g., read, write, etc.) irrespective of whether the driver layer 206 ultimately directs I/O operations to be performed using zHyperlink or zHPF (or similar). Thus, applications exchange data between the host 22 and the storage system 24 independently from any connection protocol. Moreover, the applications exchange data between the host 22 and the storage system 24 in a mixed mode that provides for some of the data to be exchanged using the zHyperlink protocol and other data to use a relatively slower protocol, such as zHPF.

Figure 4:
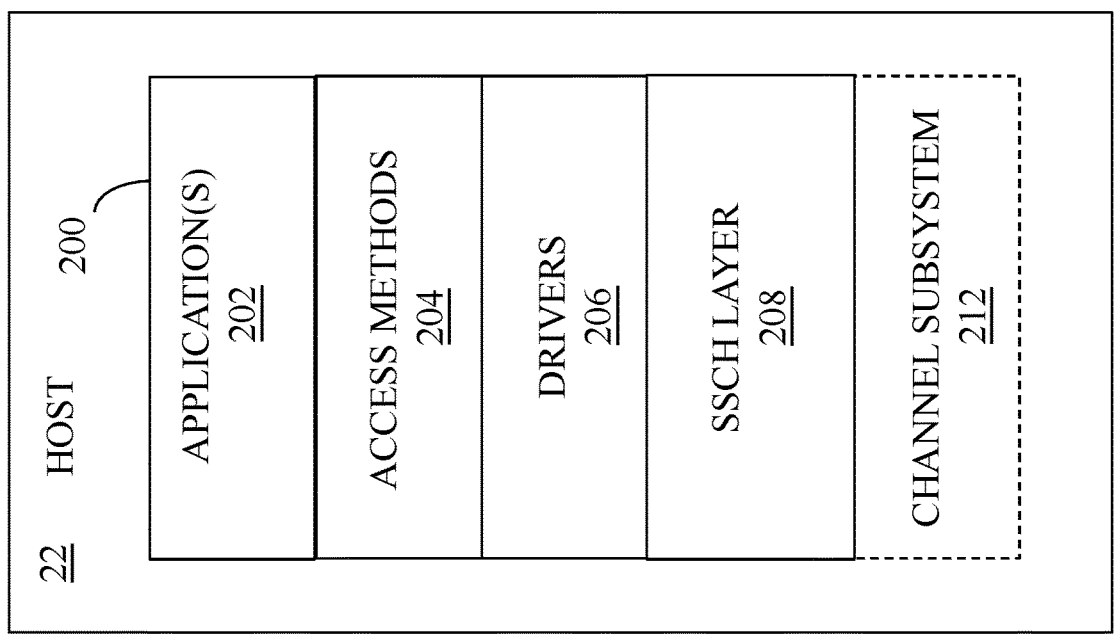
FIG. 4 is a flow diagram illustrating processing performed in connection with converting conventional I/O operations into high speed I/O operations according to an embodiment of the system described herein.

Referring to FIG. 4, a flow diagram 400 illustrates processing performed at the drivers layer 206 in connection with directing I/O operations for at least some data to be performed using zHyperlink. Processing begins at a first test step 402 where it is determined if the I/O being performed is a good candidate for being transferred using zHyperlink. The test at the step 402 is discussed in more detail elsewhere herein. If it is determined at the test step 402 that the data provided to the drivers layer 206 is not a good candidate for being transferred using zHyperlink, then control transfers from the test step 402 to a step 404 where the data is transferred conventionally (e.g., using a FICON connection). Following the step 404, processing is complete.

If it is determined at the test step 402 that the data being transferred is a good candidate for being transferred using zHyperlink, then control transfers from the test step 402 to a step 406 where the data is transferred using zHyperlink and using, for example, conventional zHyperlink transfer mechanisms. Following the step 406 is a test step 408 where it is determined if the transfer at the step 406 was successful. Note that, in some cases, a zHyperlink transfer may not be successful. For example, in instances where data being accessed is not in a cache memory of the storage system 24, a zHyperlink transfer will fail. If it is determined at the test step 408 that the zHyperlink transfer was successful, then processing is complete. Otherwise, if it is determined at the test step 408 that the zHyperlink transfer was not successful, then control transfers from the test step 408 to the step 404, discussed above, where the data is transferred conventionally (e.g., a zHPF transfer). Following the step 408, processing is complete.

Figure 5:
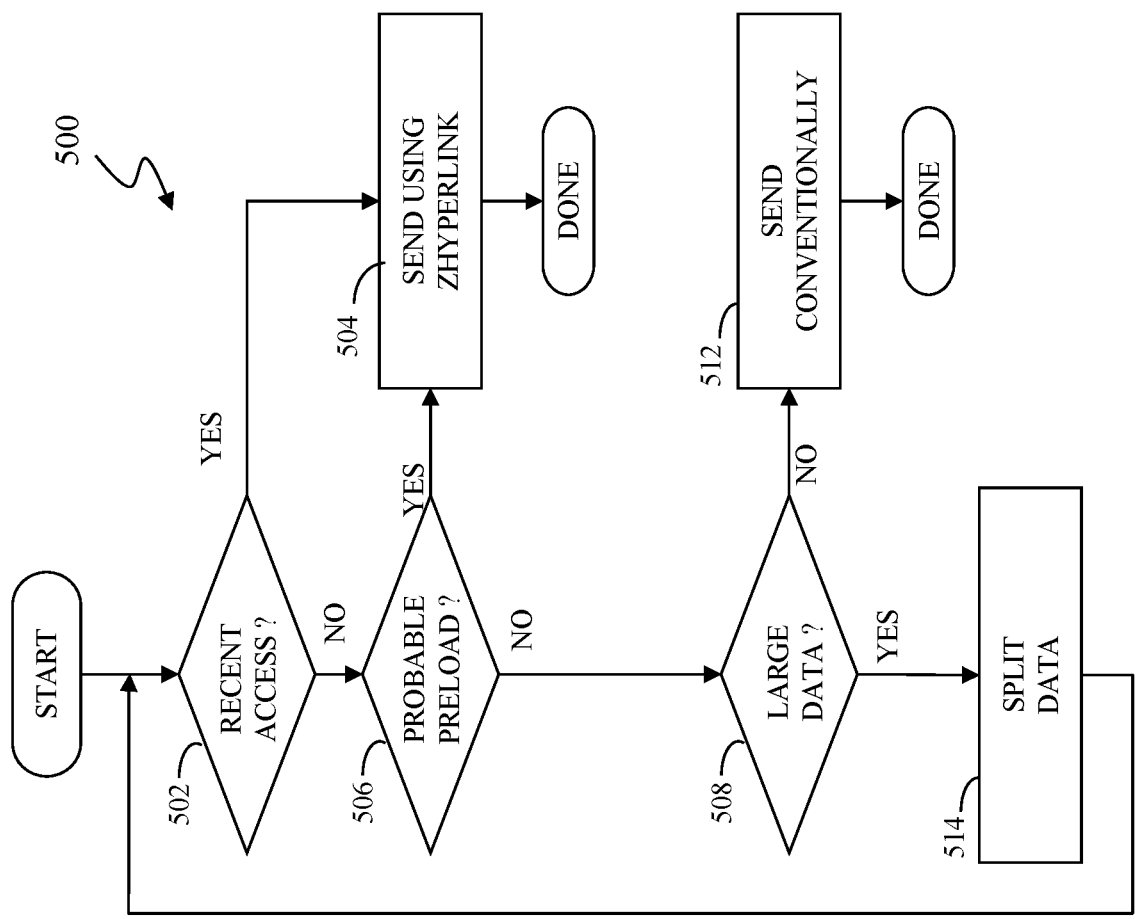
FIG. 5 is a flow diagram illustrating processing performed in connection with determining specific data to be exchanged between a host system and a storage system using high speed I/O operations according to an embodiment of the system described herein.

Referring to FIG. 5, a flow diagram 500 illustrates in more detail processing performed in connection with the step 402 where it is determined if data being transmitted is a candidate to be transferred using zHyperlink. Processing begins at a first test step 502 where it is determined if the data has been accessed recently. Note that data that has been accessed recently is a candidate for being transferred using zHyperlink because the data is more likely to still be in cache memory of the storage system 24. If it is determined at the test step 502 that the data had been accessed recently, then control transfers from the test step 502 to a step 504 where an indication (e.g., a flag) is provided to cause the data to be transferred using zHyperlink. Following the step 504, processing is complete.

If it is determined at the step 502 that the data has not been recently accessed, then control transfers from the test step 502 to a test step 506 where it is determined if the data has probably been preloaded into cache memory of the storage system 24. Data may be preloaded into the cache memory by the storage system 24 in anticipation of the data needing to be accessed by the host 22. For example, in some systems, the host reading a number of consecutive blocks will cause the storage system to access additional, follow on, consecutive blocks and store the additional blocks in cache memory in anticipation of the host requesting the additional blocks. Thus, the test at the step 506 may examine if related blocks of data (e.g., previous sequential blocks) have already been loaded, thus making it more likely that the data being examined/processed may have been preloaded into cache memory. If it is determined at the test step 506 that the data being examined is probably preloaded into the cache memory, then control transfers from the test step 506 to the step 504, discussed above, where an indication is provided to cause the data to be transferred using zHyperlink. Following the step 504, processing is complete.

If it is determined at the test step 506 that the data being examined is not probably preloaded into the cache memory, then control transfers from the test step 506 to a test step 508 where it is determined if the data is relatively large (e.g., multiple tracks of data where each track is approximately 50 k bytes). If it is determined at the test step 508 that the data is not relatively large, then control transfers from the test step 508 to a step 512 where an indication is provided to cause the data to be transferred conventionally. Following the step 512, processing is complete. Otherwise, if it is determined at the test step 508 that the data is relatively large, then control transfers from the test step 508 to a step 514 where the relatively large data is split into smaller portions. Following the step 514, control transfers back to the step 502, discussed above, for another iteration that processes the smaller portions of data individually.

Note that the data processed using the mechanism illustrated by the flow diagram 400 may include data that was otherwise designated for transfer using a protocol other than zHyperlink (e.g., data designated to be transferred using zHPF). However, it is also possible to use the processing illustrated by the flow diagram 400 to handle data that is initially designated to be transmitted using zHyperlink, where the test at the step 402, described in detail in connection with the flow diagram 500, may cause some of the data to not be ever transmitted using zHyperlink. In some cases, this may be more efficient than initially transmitting all the data using zHyperlink and then needing to retransmit data that fails when sent using zHyperlink.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor.

The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of using high speed data transfer protocol to transfer data between a host and a storage system, comprising:

determining if a portion of data is a candidate for being transferred using the high speed data transfer protocol by determining if the portion of the data has been preloaded into the cache memory of the storage system in anticipation of the portion of the data needing to be accessed by the host or if the portion of the data has been recently accessed by the host, wherein the storage system is a stand-alone device coupled to the host and wherein data is transferred between the host and the storage system in a mixed mode that provides for some of the data to be transferred to the storage system using the high speed data transfer protocol and some of the data is transferred to the storage system using a relatively low speed data transfer protocol;

if the portion of the data is not a candidate for high speed data transfer, transferring the portion of the data using the relatively low speed data transfer protocol to transfer the data via a low speed connection from the host to the storage system;

if the portion of the data is a candidate for high speed data transfer, attempting to transfer the portion of the data using the high speed data transfer protocol to transfer the data via a high speed connection from the host to the storage system; and if transferring the portion of the data using the high speed data transfer protocol is unsuccessful, transferring the portion of the data using the relatively low speed data transfer protocol to transfer the data via the low speed connection from the host to the storage system.

2. A method, according to claim 1, wherein the high speed data transfer protocol is zHyperlink.

3. A method, according to claim 1, wherein the relatively low speed data transfer protocol is zHPF.

4. A method, according to claim 1, wherein the high speed connection is one of: a PCIe connection or an InfiniBand connection.

5. A method, according to claim 1, wherein the low speed connection is an ANSI FC-SB-3 Single-Byte Command Code Sets-3 Mapping Protocol for Fibre Channel connection.

6. A method, according to claim 1, wherein relatively large portions of data are split up into smaller portions that are examined for possible transfer using the high speed data transfer protocol.

7. A method, according to claim 1, wherein a drivers layer on the host determines if a portion of the data is a candidate for being transferred using the high speed data transfer protocol.

8. A non-transitory computer readable medium, according to claim 1, wherein a drivers layer on the host determines if a portion of the data is a candidate for being transferred using the high speed data transfer protocol.

9. A method, according to claim 1, wherein determining if the portion of the data has been preloaded into the cache memory of the storage system includes determining if related blocks of data have already been accessed by the host.

10. A non-transitory computer readable medium containing software that uses high speed data transfer protocol to transfer data between a host and a storage system, the software comprising:
executable code that determines if a portion of data is a candidate for being transferred using the high speed data transfer protocol by determining if the portion of the data has been preloaded into the cache memory of the storage system in anticipation of the portion of the data needing to be accessed by the host or if the portion of the data has been recently accessed by the host, wherein the storage system is a stand-alone device coupled to the host and wherein data is transferred between the host and the storage system in a mixed mode that provides for some of the data to be transferred to the storage system using the high speed data transfer protocol and some of the data is transferred to the storage system using a relatively low speed data transfer protocol;
executable code that transfers the portion of the data using the relatively low speed data transfer protocol to transfer the data via a low speed connection from the host to the storage system if the portion of the data is not a candidate for high speed data transfer;
executable code that attempts to transfer the portion of the data using the high speed data transfer protocol to transfer the data via a high speed connection from the host to the storage system if the portion of the data is a candidate for high speed data transfer; and
executable code that transfers the portion of the data using the relatively low speed data transfer protocol to transfer the data via the low speed connection from the host to the storage system if transferring the portion of the data using the high speed data transfer protocol is unsuccessful.

11. A non-transitory computer readable medium, according to claim 10, wherein the high speed data transfer protocol is zHyperlink.

12. A non-transitory computer readable medium, according to claim 10, wherein the relatively low speed data transfer protocol is zHPF.

13. A non-transitory computer readable medium, according to claim 10, wherein the high speed connection is one of: a PCIe connection or an InfiniBand connection.

14. A non-transitory computer readable medium, according to claim 10, wherein the low speed connection is an ANSI FC-SB-3 Single-Byte Command Code Sets-3 Mapping Protocol for Fibre Channel connection.

15. A non-transitory computer readable medium, according to claim 10, wherein relatively large portions of data are split up into smaller portions that are examined for possible transfer using the high speed data transfer protocol.

16. A non-transitory computer readable medium, according to claim 10, wherein determining if the portion of the data has been preloaded into the cache memory of the storage system includes determining if related blocks of data have already been accessed by the host.

17. A storage system, comprising:
one or more physical storage units coupled to one or more disk adapters;
at least one host adapter coupled to the one or more disk adaptors;
at least one zHyperlink board coupled to the one or more disk adapters; and
at least one processor provided on the one or more disk adapters, the at least one host adapter, or both, the at least one processor having a non-transitory computer readable medium containing software that uses high speed data transfer protocol to transfer data between a host and a storage system, the software including executable code that determines if a portion of data is a candidate for being transferred using the high speed data transfer protocol by determining if the portion of the data has been preloaded into the cache memory of the storage system in anticipation of the portion of the data needing to be accessed by a host coupled to the storage system or if the portion of the data has been recently accessed by the host, wherein the storage system is a stand-alone device coupled to the host and wherein data is transferred between the host and the storage system in a mixed mode that provides for some of the data to be transferred to the storage system using the high speed data transfer protocol and some of the data is transferred to the storage system using a relatively low speed data transfer protocol, executable code that transfers the portion of the data using the relatively low speed data transfer protocol to transfer the data via a low speed connection from the host to the storage system if the portion of the data is not a candidate for high speed data transfer, executable code that attempts to transfer the portion of the data using the high speed data transfer protocol to transfer the data via a high speed connection from the host to the storage system if the portion of the data is a candidate for high speed data transfer, and executable code that transfers the portion of the data using the relatively low speed data transfer protocol to transfer the data via the low speed connection from the host to the storage system if transferring the portion of the data using the high speed data transfer protocol is unsuccessful.

18. A storage system, according to claim 17, wherein determining if the portion of the data has been preloaded into the cache memory of the storage system includes determining if related blocks of data have already been accessed by the host.

19. A storage system, according to claim 17, wherein the high speed data transfer protocol is zHyperlink and the relatively low speed data transfer protocol is zHPF.

20. A storage system, according to claim 17, wherein the high speed connection is one of: a PCIe connection or an InfiniBand connection and the low speed connection is an ANSI FC-SB-3 Single-Byte Command Code Sets-3 Mapping Protocol for Fibre Channel connection.

* * * * *